United States Patent
Vervisch et al.

(10) Patent No.: US 10,591,620 B2
(45) Date of Patent: Mar. 17, 2020

(54) PARTICLE DETECTOR MADE OF A SEMICONDUCTOR MATERIAL

(71) Applicants: UNIVERSITÉ D'AIX MARSEILLE, Marseilles (FR); CENTRE NATIONAL DE LA RECHERCHE SCIENTIFIQUE (CNRS), Paris (FR)

(72) Inventors: Wilfried Vivian Roland Vervisch, Lancon de Provence (FR); Laurent Ottaviani, Marseilles (FR); Stéphane Biondo, Allauch (FR); Vanessa Laurence Jill Hurtado Ep Vervisch, Marseilles (FR)

(73) Assignees: UNIVERSITÉ D'AIX MARSEILLE, Marseilles (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 16/302,426

(22) PCT Filed: May 15, 2017

(86) PCT No.: PCT/EP2017/061637
§ 371 (c)(1),
(2) Date: Nov. 16, 2018

(87) PCT Pub. No.: WO2017/198630
PCT Pub. Date: Nov. 23, 2017

(65) Prior Publication Data
US 2019/0277983 A1   Sep. 12, 2019

(30) Foreign Application Priority Data
May 17, 2016 (FR) ..................... 16 54382

(51) Int. Cl.
*G01T 1/29* (2006.01)
*G01T 1/26* (2006.01)

(52) U.S. Cl.
CPC . *G01T 1/29* (2013.01); *G01T 1/26* (2013.01)

(58) Field of Classification Search
CPC .................................. G01T 1/29; G01T 1/26
See application file for complete search history.

(56) References Cited

U.S. PATENT DOCUMENTS

2006/0006377 A1* 1/2006 Golovchenko ........ B82Y 10/00
257/39
2007/0257328 A1* 11/2007 Gorrell ............... H01L 31/0224
257/428

(Continued)

FOREIGN PATENT DOCUMENTS

| EP | 0 241 237 A2 | 10/1987 |
| EP | 0 736 780 A1 | 10/1996 |
| EP | 2 006 349 A1 | 12/2008 |

OTHER PUBLICATIONS

International Preliminary Report on Patentability and the Written Opinion of the International Searching Authority as issued in International Patent Application No. PCT/EP2017/061637, dated Nov. 20, 2018.

(Continued)

*Primary Examiner* — Hugh Maupin
(74) *Attorney, Agent, or Firm* — Pillsbury Winthrop Shaw Pittman LLP (57) ABSTRACT

A system for measuring a particle beam includes a central and peripheral part and a front and back panel. The central part includes a system for producing a space charge zone to be passed through by a beam to be measured, charge carriers of a first and second type being generated by the beam when the latter passes through the space charge zone. The peripheral part includes a system for collecting at least one type of (Continued)

charge carrier from among the first or second type. The peripheral part surrounds the central part such that a particle beam can pass through the central part without passing through the peripheral part, an orifice being provided in back panel, in a region of the central part such that the thickness of the region, along a normal axis to the front panel is less than that of the peripheral part along the normal axis.

14 Claims, 9 Drawing Sheets

(56) References Cited

U.S. PATENT DOCUMENTS

| | | |
|---|---|---|
| 2009/0084960 A1 | 4/2009 | Green |
| 2015/0028353 A1* | 1/2015 | Mandal ................ H01L 31/036 257/77 |

OTHER PUBLICATIONS

Biondo, S., et al., "Influence on electrical characteristics of the design of 4H—SiC ultraviolet photodetectors: Theoretical analysis and simulations," Journal of Applied Physics 111, 024506 (2012), pp. 024506-1-024506-11.

Vedraine, S., et al., "Intrinsic absorption of plasmonic structures for organic solar cells," Solar Energy Materials and Solar Cells, vol. 95, (2011), pp. S57-S64.

International Search Report as issued in International Patent Application No. PCT/EP2017/061637, dated Jul. 28, 2017.

* cited by examiner

PARTICLE DETECTOR MADE OF A SEMICONDUCTOR MATERIAL

CROSS REFERENCE TO RELATED APPLICATIONS

This application is the U.S. National Stage of PCT/EP2017/061637, filed May 15, 2017, which in turn claims priority to French Patent Application No. 1654382 filed May 17, 2016, the entire contents of all applications are incorporated herein by reference in their entireties.

TECHNICAL FIELD OF THE INVENTION

The technical field of the invention is that of detectors. More specifically, the invention relates to a detector intended to measure a particle beam or a particle environment.

TECHNOLOGICAL BACKGROUND OF THE INVENTION

In experiments bringing into play a particle beam and in particular a high energy particle beam, it is sometimes necessary to measure precisely the properties of the beam while minimising as much as possible the influence of the measurement. It is known for measuring these beams to resort to Schottky or PIN type detectors composed of a first layer of a p-doped semiconductor material, a second layer of an intrinsic semiconductor material and a third layer of an n-doped semiconductor material. This structure is going to give rise to an active zone mainly situated in the intrinsic layer in which are going to be created charges during the passage of the beam. In order to be able to measure these charges, it is known to connect an anode and a cathode on each side of the PIN structure. Generally, these detectors are produced in the thickness of a silicon wafer and may thus reach a thickness substantially equal to 300 µm. They thus absorb a non-negligible quantity of radiation. The first consequence of this absorption is to greatly perturb the beam during the measurement. Moreover, since radiation-matter interactions take place in an important volume of the material composing the detector, the degradation of the electrical and mechanical character of said detector may be very rapid. Finally, charges are created outside of the active zone and diffuse up to the electrodes adding noise to the measurement signal.

To resolve in part this problem of absorption, it is known to thin the part of the detector that the beam is made to traverse during the measurement. However, in order to collect the charges generated by the beam, it is indispensable to place electrodes in the path of the beam. The presence of these electrodes has two consequences. Firstly, the materials used for the manufacture of these electrodes absorb a non-negligible quantity of the beam. In addition, the structure of the detector has to be comprised entirely between the electrodes. Yet, as has already been specified, the active zone is mainly concentrated in the intrinsic zone of the semiconductor material. Put another way, a large part of the material traversed by the beam does not directly contribute to the detection.

There thus exists a need concerning a detector making it possible to measure a high energy particle beam while avoiding excessive absorption of said beam by the detector and while limiting the formation of undesired charges in the non-active zones.

SUMMARY OF THE INVENTION

The invention offers a solution to the aforementioned problems by providing a detection device in which the beam only traverses the useful zone of the detector, the structure enabling the collection of the charges generated by the beam in the active zone being offset laterally with respect to the path of the beam to measure.

To do so, the invention proposes a device for measuring a particle beam including a first part, designated central part, a second part, designated peripheral part, a front face and a rear face, the front face being parallel to the rear face. More specifically, the device according to the invention is such that:

the central part comprises means for forming a space charge zone intended to be traversed by a particle beam to measure, charge carriers of a first type and of a second type being generated by said beam when the latter traverses the space charge zone;

the peripheral part comprises means for collecting at least one type of charge carrier among the first type or the second type of charge carriers generated at the level of the space charge zone.

In addition, the peripheral part surrounds the central part such that a particle beam can traverse the central part without traversing the peripheral part, an orifice being arranged at the level of the rear face, in a region of the central part such that the thickness of said region of the central part along an axis normal to the front face is less than the thickness of the peripheral part along said normal axis.

Particle beam is notably taken to mean a beam of neutrons or a beam of X-rays. Put another way, the notion of particles should here be taken in the broadest sense.

Thus, the particle beam to measure only traverses the active zone of the device, that is to say the space charge zone. The perturbation caused by the detector on the beam is thus minimised. Moreover, since the beam does not traverse the part of the device through which the collection of charges is carried out, measurement noise is greatly reduced. Indeed, in devices according to the prior art, the beam traverses not only the active part, but also the zones of the device through which the charges generated by the beam are collected. Yet, the beam can also create undesired charges in these collection zones. Unlike the charges created in the active zone which are driven by the electric field, the undesired charges are going to be driven by a diffusion phenomenon. This diffusion of the undesired charges is going to produce a parasitic signal that adversely affects the measurement precision. In the detector according to the invention, the beam does not traverse the zones in charge of the collection of carriers, said zones not being situated in the trajectory of the beam. The signal obtained thus makes it possible to carry out more precise and less noisy measurements than devices according to the prior art. Moreover, the reduction of interactions to the single active zone enables a substantial reduction in the temperature of the detector linked to said interactions. In addition, the presence of an orifice arranged at the level of the rear face makes it possible to ensure that the thickness traversed by the beam is limited to the thickness of the active zone while obtaining good mechanical strength through the thicker peripheral zone.

Apart from the characteristics that have been mentioned in the preceding paragraph, the device according to one aspect of the invention may have one or more of the complementary characteristics among the following, considered individually or according to all technically possible combinations thereof.

Advantageously, the central part is made of a wide gap semiconductor material in order to accept high doses of high energy particles. Preferentially, the semiconductor is silicon carbide. Wide gap is taken to mean a gap of which the energy is at least two times greater than the energy of the gap of silicon.

Preferentially, the space charge zone is formed by means of a Schottky diode enabling a rapid response of the covering of direct-inverse behaviour, a PN diode then taking advantage of the tunnel effect or a PIN diode enabling good voltage withstand quality.

Advantageously, at least one interface facing the orifice arranged in the rear (or front) face is structured so as to favour the absorption, the transmission or the reflection of one or several wavelengths. Interface is taken to mean a limit between two materials (or two layers). It may thus be the limit between two constituent materials (or two layers) of the device or a limit between the device and its environment (the surface of the bottom of the orifice for example) or the front face. Structured is taken to mean the fact that the interface has reliefs forming a pattern (pyramid, truncated pyramid, tile, etc.), the dimensions of which are determined as a function of the wavelength of which is it wished to favour the absorption, the structuring constituting a diffraction array sometimes called "photonic crystal". Favouring absorption, transmission or reflection is taken to mean the fact that, for a given device, the absorption, transmission or reflection coefficient of the wavelength considered with the structuring is greater than the absorption, transmission or reflection coefficient without the structuring, everything otherwise being equal. Thus, it is possible to favour the absorption, the transmission or the reflection of the part of a beam associated with one wavelength, several wavelengths or one or several ranges of wavelengths.

Advantageously, in an alternative or complementary embodiment, metal beads are present in the central part of the detection device, preferably facing the orifice arranged in the rear face, said beads being spread out according to a periodic structure so as to form a plasmonic array. Thus, just like the structurings mentioned previously, it is possible to increase the absorption coefficient of the material comprising said beads (and thus of the device) for one or several chosen wavelengths.

Advantageously, the space charge zone of the central part is uniquely situated in the region of the central part facing the orifice.

Thus, the active zone is limited to the zone actually traversed by the beam.

Alternatively, the space charge zone of the central part extends beyond the region of the central part facing the orifice.

Thus, it is possible to limit the formation of a MIS (Metal Insulator Semiconductor) structure, in particular when the space charge zone is formed by a PN diode or a PIN diode. Capacitive phenomena are thus reduced between the n-doped layer and the metal layer of the anode.

Advantageously, the central part includes:
a first layer of a semiconductor material;
a second layer of a conductor material covering the first layer;
the space charge zone being formed by the Schottky diode formed by the first layer and the second layer, the orifice being arranged in the first layer.

Thus, one of the layers forming the Schottky diode being metallic, it is possible to collect one type of charge carrier by this same layer, which eliminates at least one deposition step and facilitates the manufacture of the device compared to a space charge zone produced by a diode.

Preferentially, the peripheral part includes:
a third layer of a conductor material;
a first layer of a semiconductor material covering the third layer and arranged in continuity with the first layer of the central part;
a second layer of a conductor material covering the first layer and arranged in continuity with the second layer of the central part;
the third layer of a conductor material ensuring the collection of a first type of charge carrier generated in the space charge zone.

Thus, the third layer of a material makes it possible to collect one type of charge carrier. Moreover, this layer only being situated at the level of the peripheral part, it does not perturb the beam.

Advantageously, the central part includes:
a first layer of a semiconductor material doped with a first type of doping;
a second layer of a semiconductor material doped with a second type of doping opposite to the first type of doping, said second layer covering the first layer;
a fourth layer of a conductor material, said fourth layer covering the second layer;
the space charge zone being formed by the PN diode formed by the first layer and the second layer, the orifice being arranged in the first layer.

Preferably, the peripheral part includes:
a third layer of a conductor material;
a first layer of a semiconductor material doped with a first type of doping covering the third layer and arranged in continuity with the first layer of the central part, the first layer of the central part and of the peripheral part having the same doping level;
a second layer of a semiconductor material doped with a second type of doping opposite to the first type of doping covering the first layer, said second layer being arranged in continuity with the second layer of the central part, the second layer of the central part and of the peripheral part having the same doping level;
a fourth layer of a conductor material, said fourth layer covering the second layer, said fourth layer being arranged in continuity with the fourth layer of the central part;
the third layer of a conductor material ensuring the collection of a first type of charge carrier generated in the space charge zone.

Thus, the third layer of a material makes it possible to collect one type of charge carrier. Moreover, this layer only being situated at the level of the peripheral part, it does not perturb the beam.

Advantageously, the central part includes a fifth layer of a conductor material covering the second layer and in that the peripheral part includes:
a third layer of a conductor material;
a first layer of a semiconductor material doped with a first type of doping covering the third layer and arranged in continuity with the first layer of the central part, the first layer of the central part and of the peripheral part having the same doping level;
a sixth layer of an oxide covering the first layer;
a fourth layer of a conductor material covering the sixth layer;
the fourth layer forming a step between the peripheral part and the central part covering a lateral surface of the sixth layer so as to ensure continuity between the fourth layer of the central part and the fourth layer of the peripheral part.

Thus, the active zone is limited to the zone actually traversed by the beam, the collection of charges from the active zone to the anode being carried out by means of the eighth layer.

Preferentially, the peripheral part comprises a fifth layer of a semiconductor material doped with a first type of doping, the doping level of the fifth layer being higher than the doping level of the first layer, the fifth layer being situated between the third layer and the first layer of the peripheral part.

Thus a PIN type configuration is obtained, the PIN diode formed between the fifth layer, the first layer and the second layer enabling better collection of the charges generated by the particle beam to detect.

Advantageously, the first orifice is defined by a side wall and by a bottom and an oxide layer covers the side wall and the bottom of the first orifice.

Thus, the dangling bonds derived from the manufacture of the first orifice are neutralised and the electrical perturbations that said dangling bonds are capable of generating are eliminated.

Advantageously, the section of the first orifice and/or the second orifice is of circular or square shape. Advantageously, the first orifice and the second orifice are positioned at the centre of the device. Positioned at the centre of the device is here taken to mean the fact that when the device and the orifice are projected onto a surface perpendicular to the direction of the stack, the projection of the orifice onto this surface is centred relative to the projection of the device.

Preferentially, in the central part, the fourth layer only covers a part of the second layer.

Thus, the absorption of the beam by the fourth layer is limited while ensuring a collection of charges from the active zone to the anode.

The invention and its different applications will be better understood on reading the description that follows and by examining the figures that accompany it.

BRIEF DESCRIPTION OF THE FIGURES

The figures are presented for indicative purposes and in no way limit the invention and illustrate.

DETAILED DESCRIPTION OF AT LEAST ONE EMBODIMENT OF THE INVENTION

Unless stated otherwise, a same element appearing in the different figures has a single reference.

Figures 1A, 1B:
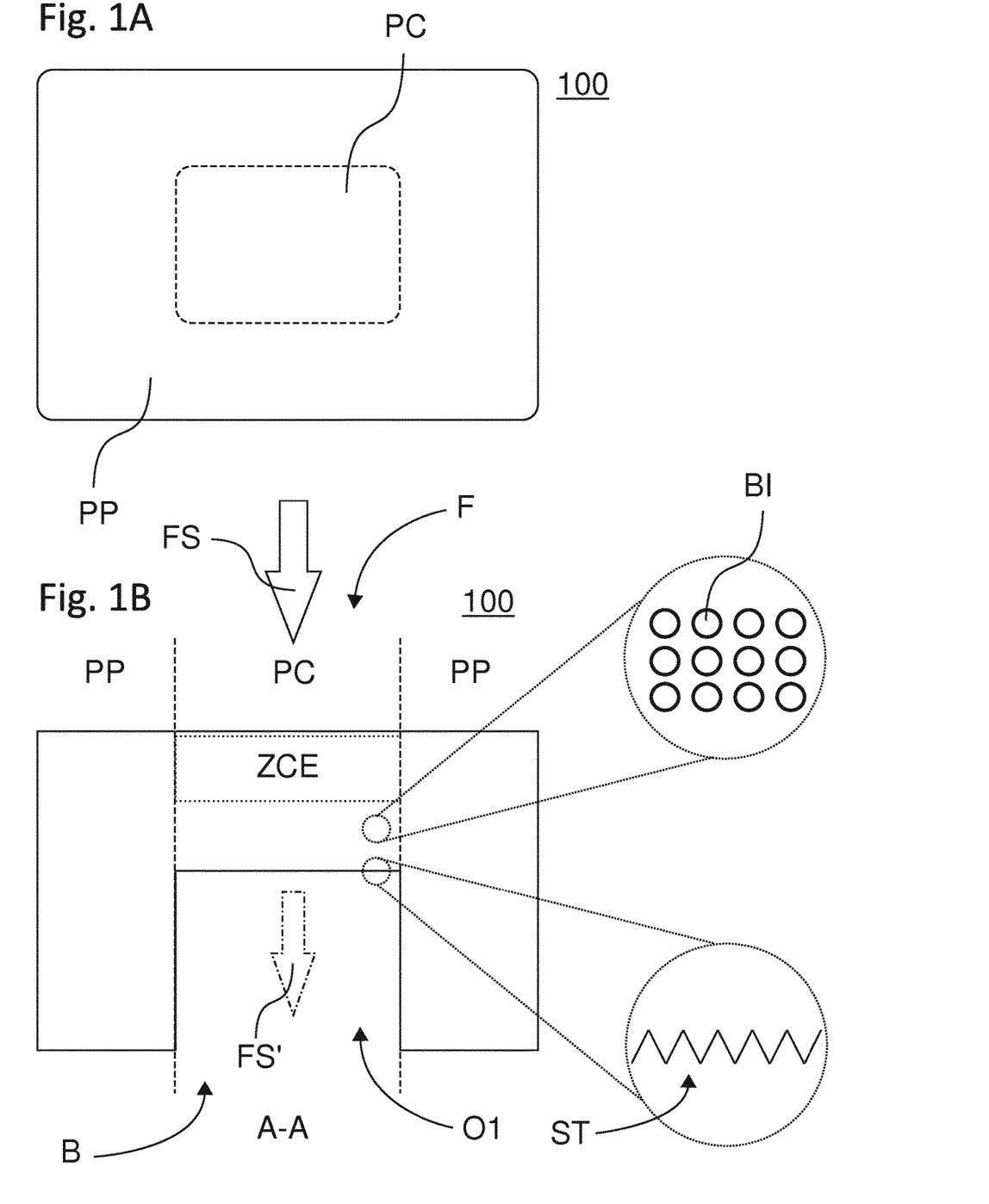
FIGS. 1A and 1B, a top and a sectional view of a device according to one embodiment of the invention.

A first embodiment of the invention illustrated in FIGS. 1A and 1B concerns a device 100 for measuring a particle beam FS including a first part, designated central part PC, a second part, designated peripheral part PP. The central part PC comprises means for forming a space charge zone ZCE (in dotted lines in all of the figures) intended to be traversed by a particle beam FS to measure, charge carriers of a first type and of a second type being generated by said beam FS when the latter traverses the space charge zone ZCE. Moreover, the peripheral part PP comprises means for collecting at least one type of charge carrier among the first type or the second type of charge carriers generated at the level of the space charge zone ZCE. In addition, the peripheral part PP surrounds the central part PC such that a particle beam FS can traverse the central part PC without traversing the peripheral part PP.

Thus, the device according to the invention makes it possible to measure a particle beam FS while minimising perturbations on the output beam FS' caused by the measurement. Such a configuration notably makes it possible to reduce the quantity of radiation absorbed by the device and thus the number of radiation-matter interactions capable of perturbing the measurement or degrading the measuring device.

Preferably, the measuring device 100 according to the invention comprises a front face F and a rear face B, the front face F being parallel to the rear face B, and in that an orifice O1 is arranged at the level of the rear face B, in a region of the central part PC such that the thickness of said region of the central part PC along an axis normal to the front face F is less than the thickness of the peripheral part PP along said normal axis. The orifice O1 may be of circular, rectangular or instead square shape. More generally, it can take any polygon shape. The size of the orifice O1 is determined by the size of the beam to measure. Preferably, the width of the beam is less than the width of the orifice O1. The width of the central region can thus vary from a micron to ten or so centimetres. Preferably, the totality of the central part PC is facing the orifice O1. Put another way, the surface of the central part PC is equal to the surface of a section of the orifice O1.

In one embodiment, at least one interface facing the orifice O1 arranged in the rear face B is structured so as to favour the absorption, the transmission or the reflection of one or several wavelengths. Thus, it is possible to favour the absorption of the part of a beam FS associated with one wavelength, several wavelengths or one or several ranges of wavelengths. This is notably due to the fact that the structuring ST thereby created is going to favour the gathering of certain photons (in the case of UV radiation in particular) and thus the absorption of the radiation of which the wavelength corresponds to said photons. The structuring dimensions are in general of the same order of magnitude as the dimensions of the wavelength that it is sought to target, that is to say of the order of several hundreds of nanometres, for example 200 to 300 nm. Thus, it is possible to obtain, for one or several wavelengths, a greater absorption or even a reflection, and notably absorption rates close to 100%, for example 99.9%, for a chosen wavelength. The device 100 according to the invention may thus, in addition to detection, contribute to filtering the incident beam FS. It is thus possible to obtain a detection device 100 that reads the intensity of the beam FS on a given length for which the absorption coefficient is high, for example greater than or equal to 90%, while absorbing little of one or several other wavelengths for which the absorption coefficient is low, for example less than or equal to 10%. More details concerning the geometric characteristics of the structuring as a function of the sought after effect (for example improvement of the absorption) for a given wavelength may be found in the article "Influence on electrical characteristics of the design of 4H—SiC ultraviolet photodetectors: Theoretical analysis and simulations" Journal of Applied Physics 111, 024506 (2012); doi: http://dx.doi.org/10.1063/1-3676284

In one embodiment, metal beads BI, for example beads BI of gold, aluminium, are present in the material of the central part PC, preferably facing the orifice O1 arranged in the rear face B. The beads BI are spread out according to a periodic structure so as to form a plasmonic array. On the passage of the beam FS, electromagnetic resonances are going to be produced at the level of the periodic structure thereby constituted making possible the increase in the absorption coefficient of the material comprising said beads BI (and thus of the device 100) for one or several chosen wavelengths. The wavelengths affected by the periodic structure are a function of the geometric parameters of said structure, notably the size of the beads BI and the distance between the beads in the three dimensions of space. More details concerning the geometric characteristics of the periodic structure and the choice of the metals constituting the beads as a function of the desired effect (for example improvement of the absorption) for a given wavelength may be found in the article "Intrinsic absorption of plasmonic structures for organic solar cells", Solar Energy Materials and Solar Cells, volume 95, S57-S64.

Preferably, the central part PC is centred with respect to the whole of the device 100. The central part PC and/or the peripheral part PP of the component may be made, at least in part, of a wide gap semiconductor material, for example silicon carbide, diamond or a semiconductor alloy composed of column III-V or II-VI elements. For example, when the semiconductor is diamond, p-doping may be obtained by implantation of boron atoms and n-doping by implantation of phosphorous atoms. In a second example, when the semiconductor is silicon carbide, p-doping may be by implantation of boron atoms and n-doping by implantation of nitrogen atoms.

Preferably, the space charge zone ZCE of the central part PC is uniquely situated in the region of the central part PC facing the orifice O1. Alternatively, the space charge zone ZCE of the central part PC extends beyond the region of the central part PC facing the orifice O1.

Figure 2:
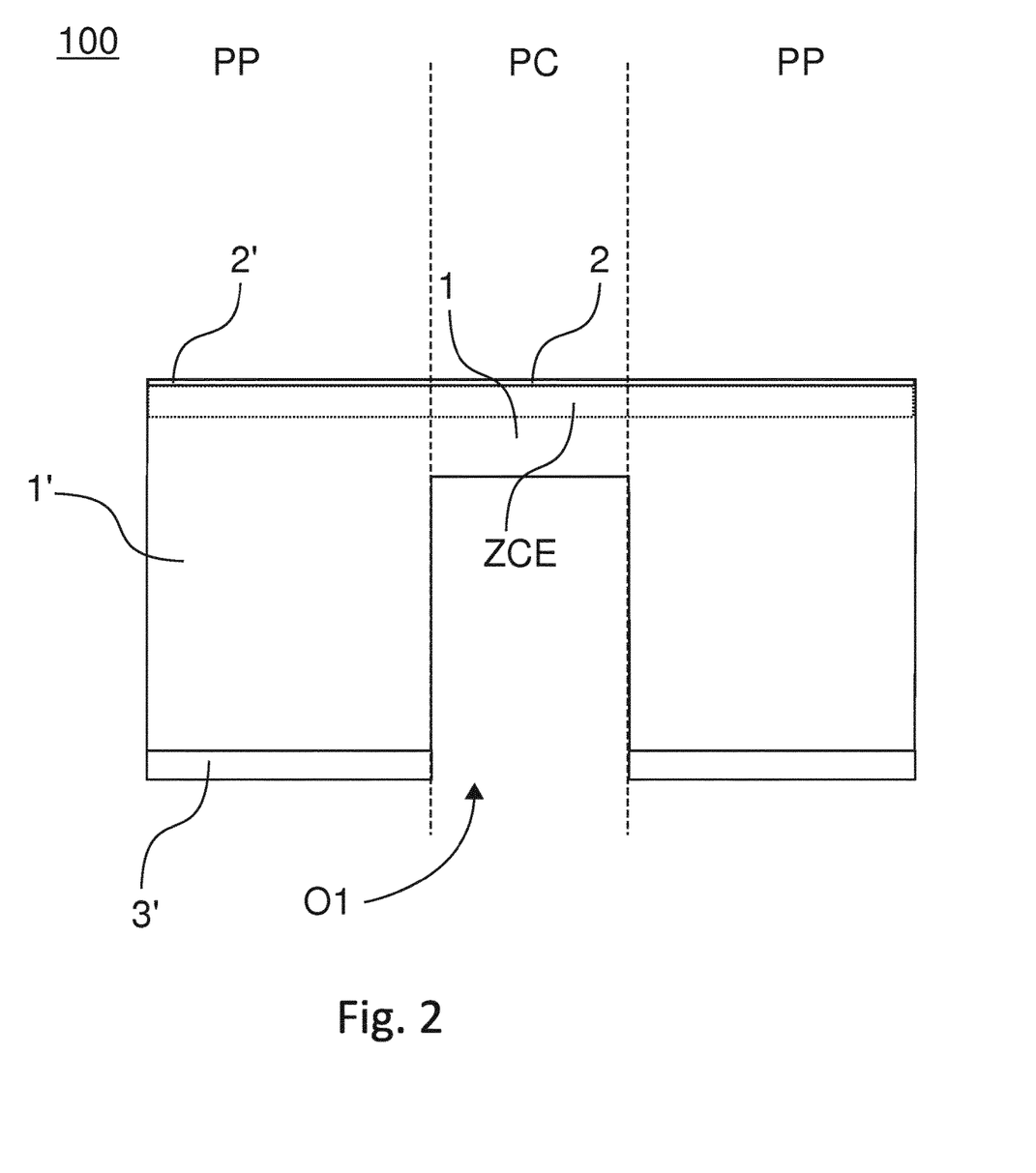
FIG. 2, a sectional view of the structure of the device according to a first embodiment.

In one first embodiment illustrated in FIG. 2, the central part PC includes a first layer 1 of a semiconductor material; and a second layer 2 of a conductor material covering the first layer 1. In this embodiment, the space charge zone ZCE is formed by the Schottky diode formed by the first layer 1 and the second layer 2, the orifice O1 being arranged in the first layer 1. The orifice O1 arranged in the first layer 1 of the central part PC may be produced by an RIE type etching technique.

Preferably, in this embodiment, the peripheral part PP includes a third layer 3' of a conductor material; a first layer 1' of a semiconductor material covering the third layer 3' and arranged in continuity with the first layer 1 of the central part PC; and a second layer 2' of a conductor material covering the first layer 1 and arranged in continuity with the second layer 2 of the central part PC.

In this configuration, called Schottky configuration, the space charge zone ZCE is formed by the Schottky diode constituted of the first layer 1 of a conductor material and the second layer 2 of a semiconductor material. The space charge zone ZCE is thus situated on the central part PC but also on the peripheral part PP. Moreover, the third layer 3' of a conductor material ensures the collection of a first type of charge carrier generated in the space charge zone ZCE whereas the first layer 2,2' made of a conductor material ensures the collection of a second type of charge carrier generated in the space charge zone ZCE. The second layer 2,2' and the third layer 3,3' may be constituted of a metal such as copper, zinc or gold or instead a mono or multilayer graphene. Nickel, aluminium, titanium or tungsten may also be used. More generally, any conductor material suited to the manufacturing or operating conditions of the device may be chosen. The material used for the second layer 2,2' may be different from the material used for the third layer 3,3'. Preferably, the materials used for the third layer 3' may be chosen so as to obtain an ohmic contact between the third layer 3' and the first layer 1' of the peripheral part PP.

Preferably, the doping level of the first layer 1 of the central part PC is identical to the doping level of the first layer 1' of the peripheral part. The manufacturing method is facilitated because it only requires a single doping level.

Alternatively, the doping level of the first layer 1 of the central part PC is less than the doping level of the first layer 1' of the peripheral part. This configuration makes it possible to ensure better distribution of the electric field and thus to use higher voltages for the polarisation of the detector.

In one exemplary embodiment, the first layer 1,1' has a thickness comprised between 500 nm and 50 microns. In one embodiment, the second layer 2,2' has a thickness comprised between 50 nm and 200 nm, preferably substantially equal to 100 nm.

Figure 3:
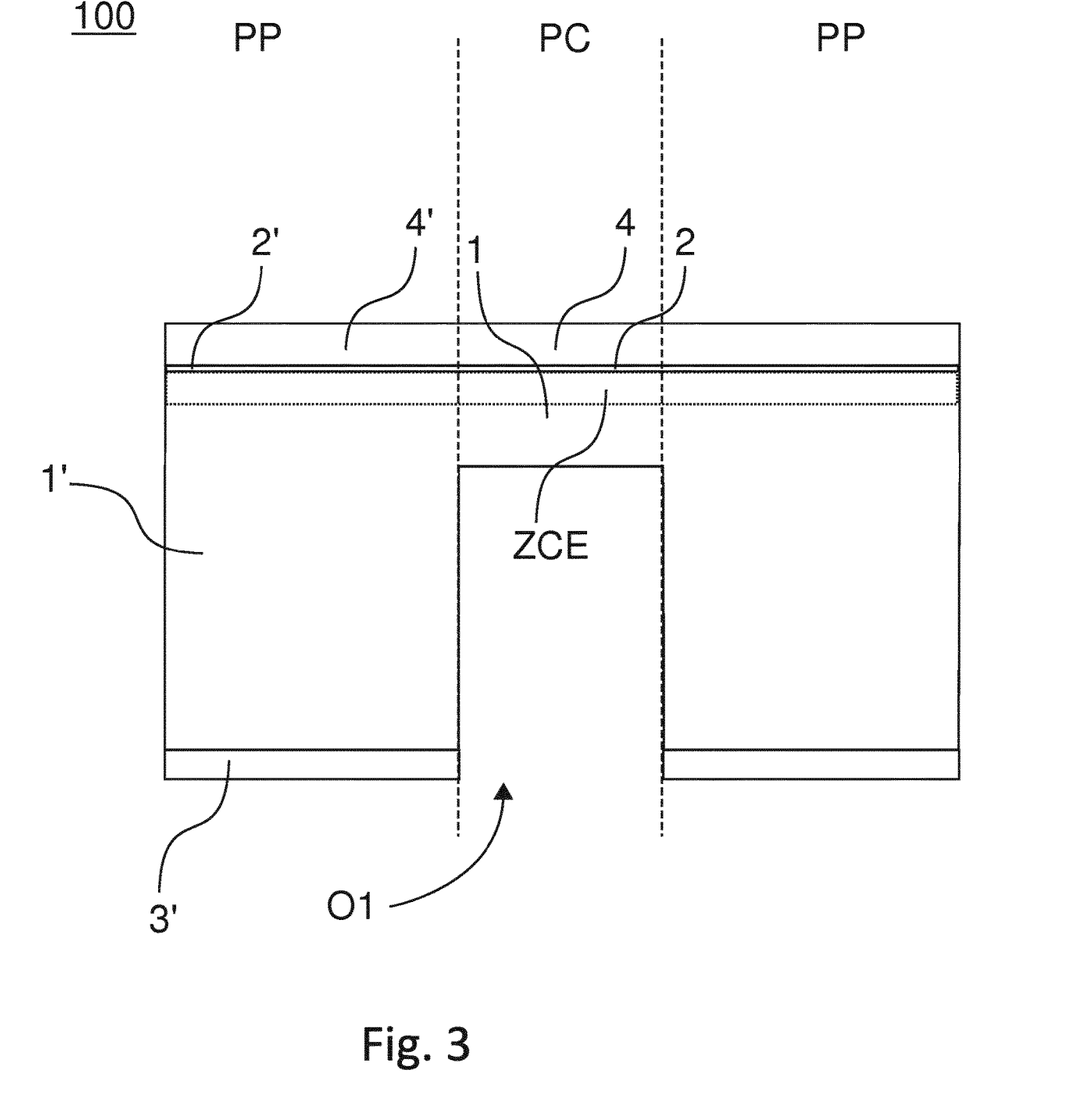
FIG. 3, a sectional view of the structure of the device according to a second embodiment.

In a second embodiment of a device according to the invention illustrated in FIG. 3, the central part PC includes a first layer 1 of a semiconductor material doped with a first type of doping; a second layer 2 of a semiconductor material doped with a second type of doping opposite to the first type of doping, said second layer 2 covering the first layer 1; and a fourth layer 4 of a conductor material, said fourth layer 4 covering the second layer 2. In this embodiment, the space charge zone ZCE is formed by the PN diode formed by the first layer 1 and the second layer 2, the orifice O1 being arranged in the first layer 1. The orifice O1 arranged in the first layer 1 of the central part PC may be produced by an RIE type etching technique.

Preferably, in this embodiment, the peripheral part PP includes a third layer 3' o a conductor material; a first layer 1' of a semiconductor material doped with a first type of doping covering the third layer 3' and arranged in continuity with the first layer 1 of the central part PC; a second layer 2' of a semiconductor material doped with a second type of doping opposite to the first type of doping covering the first layer 1', said second layer 2' being arranged in continuity with the second layer 2 of the central part PC; and a fourth layer 4' of a conductor material, said fourth layer 4' covering the second layer 2', said fourth layer 4' being arranged in continuity with the fourth layer 4 of the part PC. In one embodiment, the doping of the first layer 1,1' is of n-type and the doping of the second layer 2,2' is of p-type.

In this configuration, called PN configuration, the space charge zone ZCE is formed by the PN diode constituted of the first layer 1,1' of a semiconductor material doped with a first type of doping and the second layer 2,2' of a semiconductor material doped with a second type of doping opposite to the first type of doping. The space charge zone ZCE is thus situated on the central part PC but also on the peripheral part PP. Moreover, the third layer 3' of the peripheral part ensures the collection of a first type of charge carrier generated in the space charge zone ZCE whereas the fourth layer 4,4', made of a conductor material, ensures the collection of a second type of charge carrier generated in the space charge zone ZCE. The third layer 3' and the fourth layer 4,4' may be constituted of a metal such as copper, zinc or gold or instead of mono or multilayer graphene. It is also possible to use nickel, aluminium, titanium or tungsten. More generally, any conductor material suited to the manufacturing or operating of the device may be chosen. The material used for the third layer 3' may be different from the material used for the fourth layer 4,4'. Preferably, the materials used for the third layer 3' may be chosen so as to obtain a contact between the third layer 3' and the first layer 1' of the peripheral part PP. Similarly, the materials used for the fourth layer 4,4' may be chosen so as to obtain an ohmic contact between the fourth layer 4,4' and the second layer 2,2'.

Preferably, the doping level of the first layer 1 of the central part PC is identical to the doping level of the first layer 1' of the peripheral part PP. Similarly, the doping level of the second layer 2 of the central part PC is identical to the doping level of the second layer 2' of the peripheral part. As explained previously, the manufacturing method is facilitated because it only requires a single doping level.

In one exemplary embodiment, the doping of the first layer 1,1' is of n-type and the doping of the second layer 2,2' is of p-type. The doping level of the first layer 1,1' is comprised between $5 \cdot 10^{14}$ and $5 \cdot 10^{19}$ atoms per cm$^3$, preferably substantially equal to $5 \cdot 10^{15}$ atoms per cm$^3$. The doping level of the second layer 2,2' is comprised between $1 \cdot 10^{16}$ and $5 \cdot 10^{19}$ atoms per cm$^3$, preferably substantially equal to $1 \cdot 10^{19}$ atoms per cm$^3$.

Alternatively, the doping level of the first layer 1 of the central part PC is less than the doping level of the first layer 1' of the peripheral part. Similarly, the doping level of the second layer 2 of the central part PC is less than the doping level of the second layer 2' of the peripheral part. As explained previously, this configuration makes it possible to ensure better distribution of the electric field, which makes it possible to use higher voltages for the polarisation of the detector.

Figure 4:
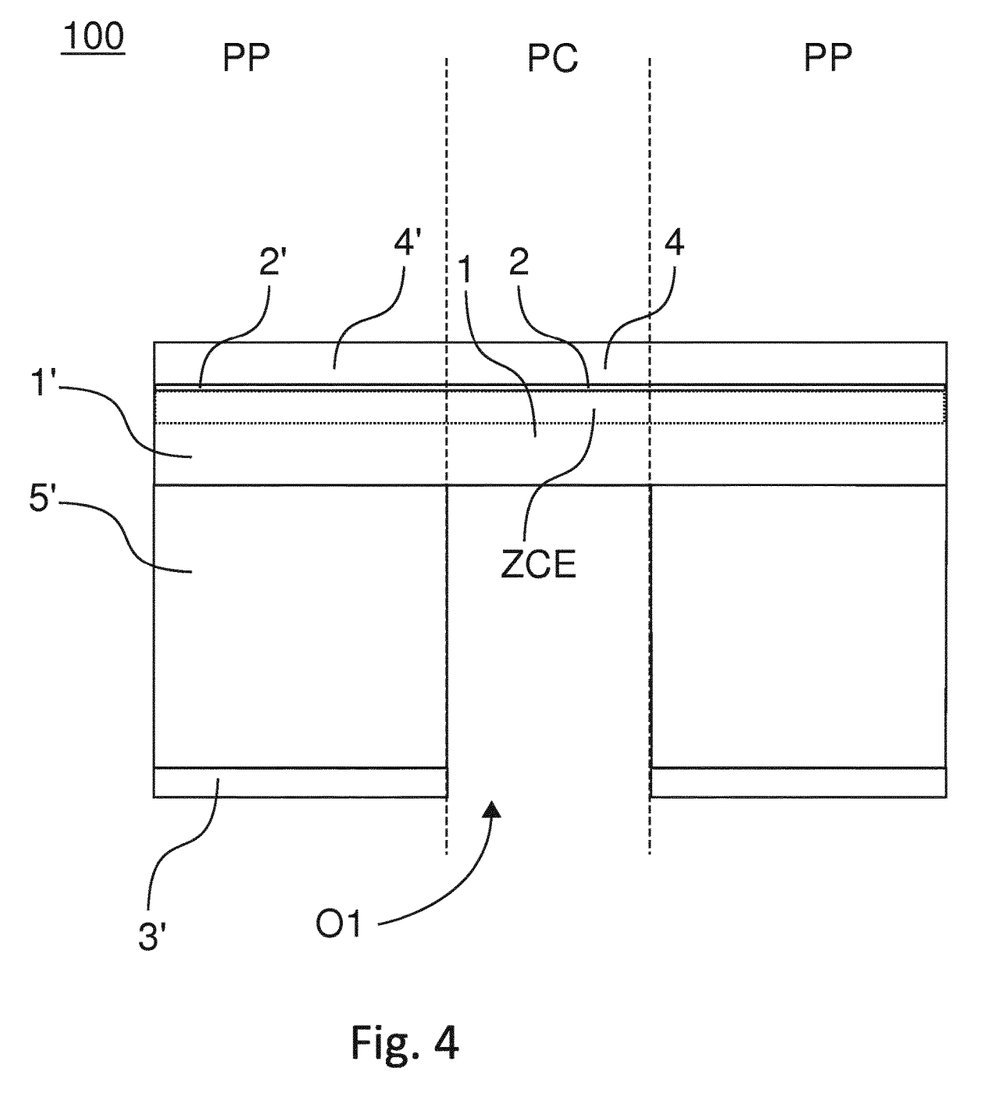
FIG. 4, a sectional view of the structure of the device according to a third embodiment.

In a third embodiment illustrated in FIG. 4, the peripheral part PP comprises a fifth layer 5' of a semiconductor material doped with a first type of doping, the doping level of the fifth layer 5' of the peripheral part PP being higher than the doping level of the first layer 1' of the peripheral part PP, the fifth layer 5' being situated between the third layer 3' and the first layer 1' of the peripheral part PP. Thus in this configuration, called PIN configuration, the PIN diode formed between the fifth layer 5' of the peripheral part, the first layer 1,1' and the first layer 2,2' enables better recovery of the charges generated in the central part PC by the beam FS of particles to detect. The central part PC of the device is preferably identical to the central part of the device according to the second embodiment.

The fifth layer 5' of the peripheral part PP may for example be obtained by etching of the orifice O1 in a layer of a semiconductor material doped with a first type of doping, said layer being present in the central part PC and the peripheral part PP before etching and being etched over its entire thickness in order to form the orifice O1. The etching may be carried out by an RIE type dry technique or instead a wet technique.

Preferably, the doping of the first layer 1,1' and of the fifth layer 5' of the peripheral part PP is of n-type and the doping of the second layer 2,2' is of p-type. The doping level of the fifth layer 5' is comprised between $1 \cdot 10^{16}$ and $1 \cdot 10^{19}$ atoms per cm$^3$, preferably substantially equal to $1 \cdot 10^{18}$ atoms per cm$^3$. The doping level of the first layer 1,1' is comprised between $5 \cdot 10^{14}$ and $5 \cdot 10^{19}$ atoms per cm$^3$, preferably substantially equal to $5 \cdot 10^{15}$ atoms per cm$^3$. The doping level of the second layer 2,2' is comprised between $1 \cdot 10^{16}$ and $5 \cdot 10^{19}$ atoms per cm$^3$, preferably substantially equal to $1 \cdot 10^{19}$ atoms per cm$^3$.

In one exemplary embodiment, the first layer 1,1' has a thickness comprised between 500 nm and 50 microns; the second layer 2,2' has a thickness comprised between 50 and 200 nm, preferably substantially equal to 100 nm; and the fifth layer has a thickness comprised between 250 and 350 microns, preferably substantially equal to 300 microns.

Figure 5:
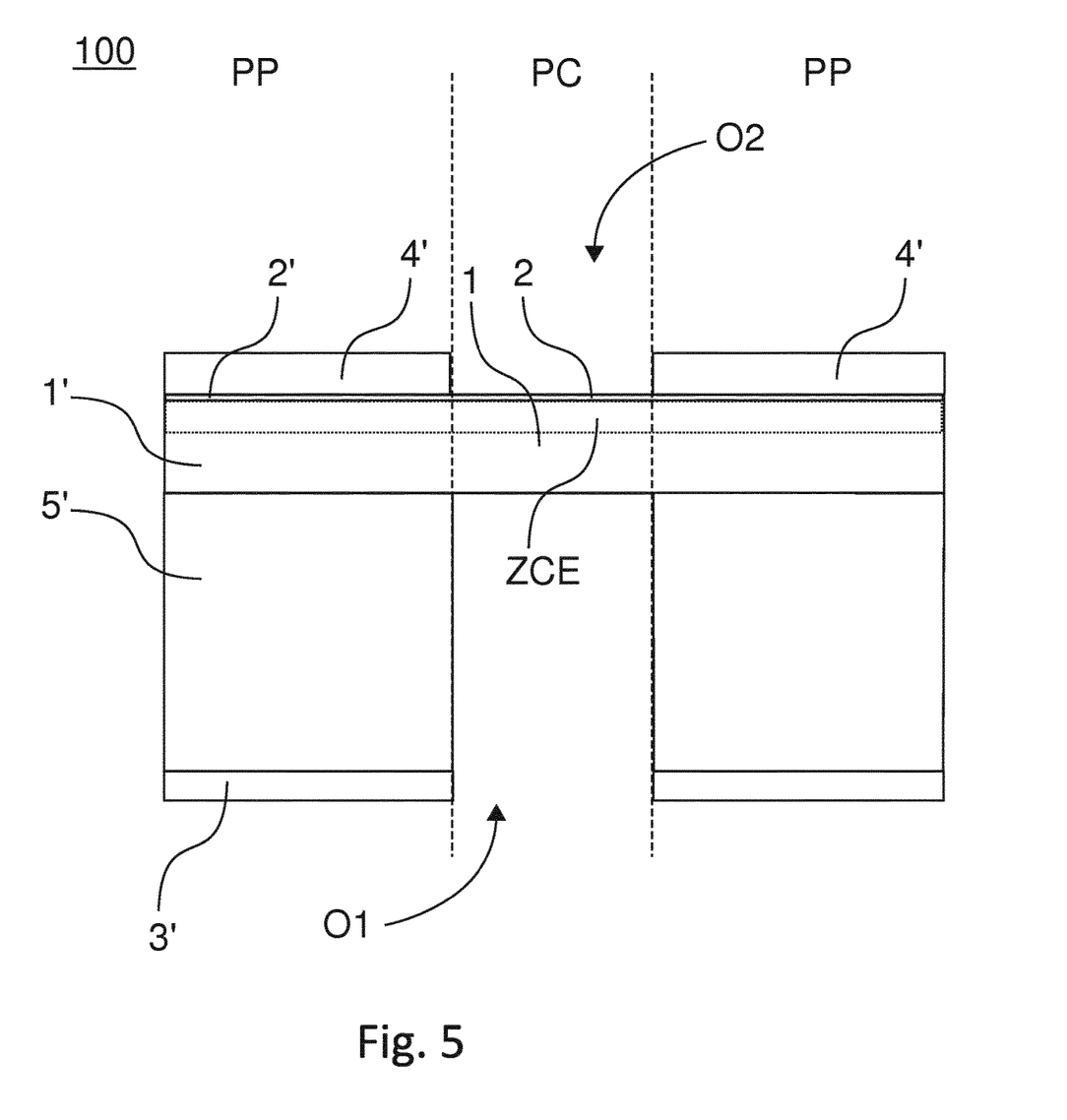
FIG. 5, a sectional view of the structure of the device according to a fourth embodiment.

The beam to measure only traversing the detector at the level of the central part PC, it may be advantageous to offset the totality of the electrodes required for the recovery of the charge carriers at the level of the peripheral part. To do so, in a fourth embodiment illustrated in FIG. 5, the central part PC includes a first layer 1 of a semiconductor material doped with a first type of doping and a second layer 2 of a semiconductor material doped with a second type of doping opposite to the first type of doping, said second layer 2 covering the first layer 1. The central part is thus without electrode in this embodiment. In this embodiment, the space charge zone is also realised by the PN diode constituted of the first layer 1,1' of a semiconductor material doped with a first type of doping and the second layer 2,2' of a semiconductor material doped with a second type of doping opposite to the first type of doping. On the other hand, the charge carriers are recovered uniquely at the level of the peripheral part by the third layer 3' and fourth layer 4' of the peripheral part PP. In this configuration, the beam only traverses the first layer 1 and the second layer 2 of the central part at the level of which is formed the space charge zone. In this embodiment, the fourth layer 4' is only found on the peripheral part and thus forms a second orifice O2.

In the preceding embodiment, the space charge zone ZCE is present both in the central part PC and the peripheral part PP of the device. However, it may be advantageous to have a space charge zone ZCE only in the central part PC of the detection device. To do so, in a fifth embodiment illustrated in FIG. 6, the peripheral part PP includes a third layer 3' of a conductor material; a first layer 1' of a semiconductor material doped with a first type of doping covering the third layer 3' and arranged in continuity with the first layer 1 of the central part PC; a sixth layer 6' of an oxide covering the first layer 1'; and a fourth layer 4' of a conductor material covering the sixth layer 6'. Thus, the second layer 2,2' only being present in the central part PC of the device, the space charge zone ZCE is also restricted to the central part PC of the device 100.

Figure 6:
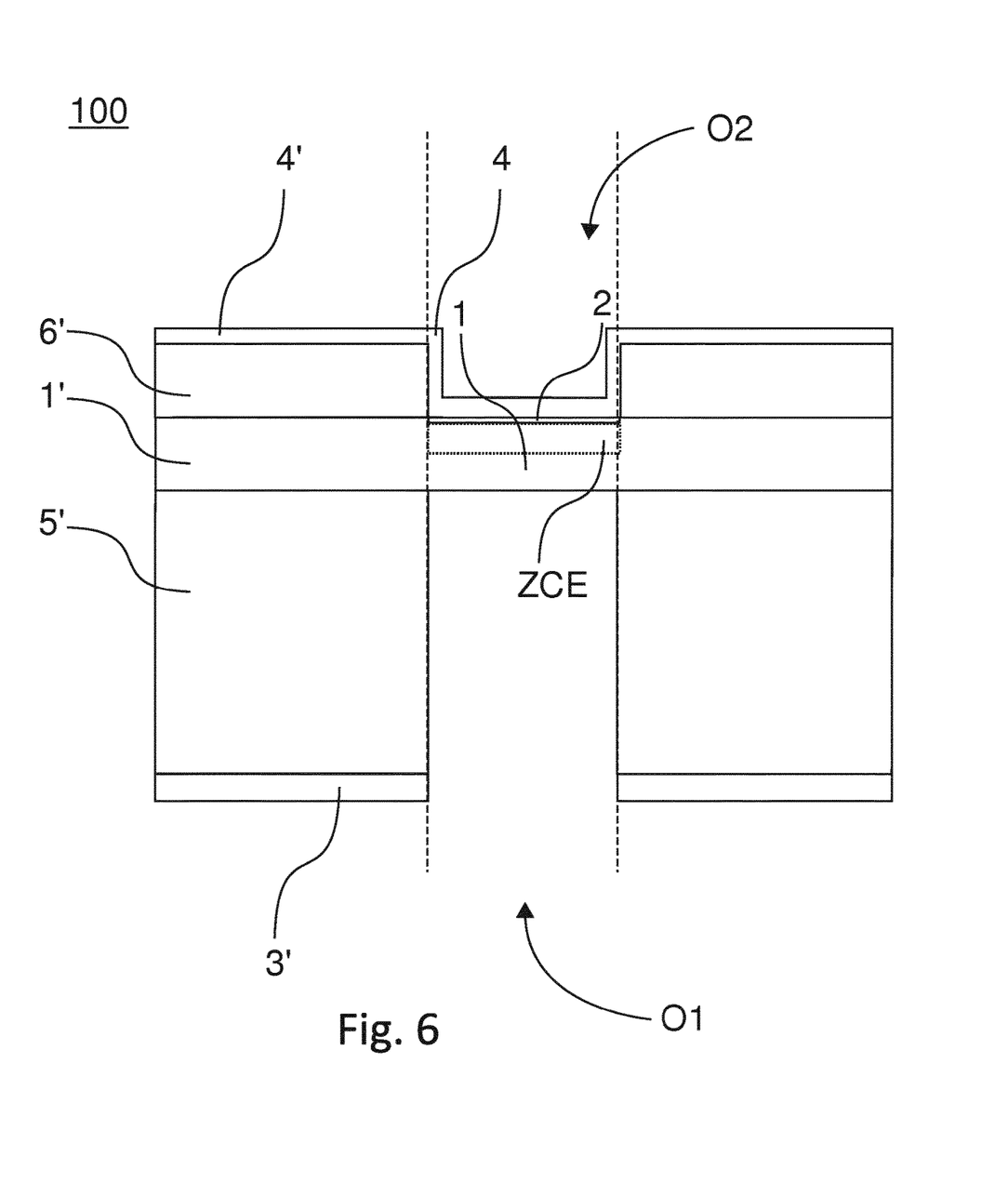
FIG. 6, a sectional view of the structure of the device according to a fifth embodiment.

In this embodiment, the fourth layer 4,4' forms a step between the peripheral part PP and the central part PC covering a lateral surface of the sixth layer 6 so as to ensure continuity between the fourth layer 4 of the central part PC and the fourth layer 4' of the peripheral part PP. In this embodiment, the sixth layer 6' is only found on the peripheral part and thus forms a second orifice O2.

Figure 7:
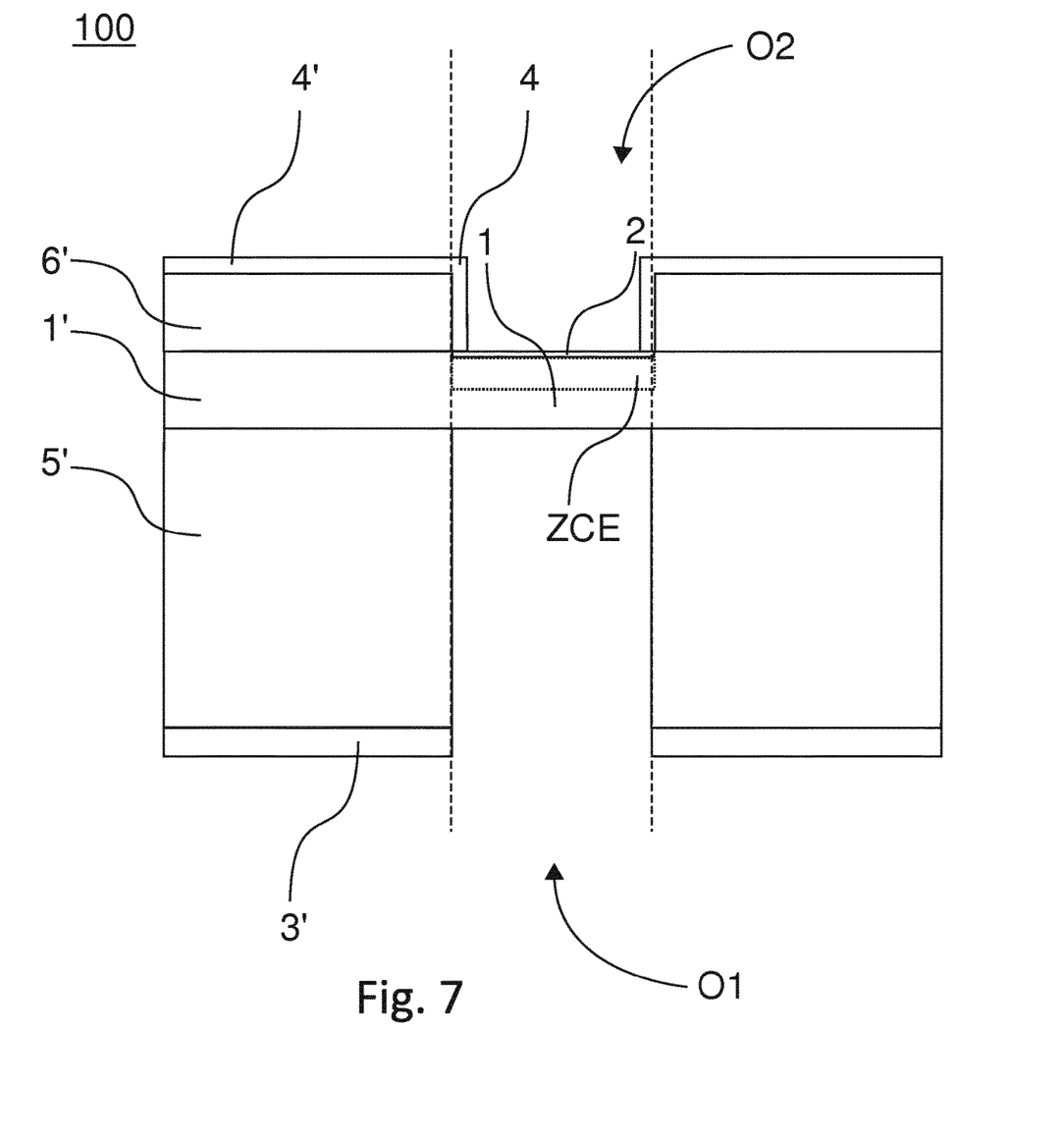
FIG. 7, a sectional view of the structure of the device according to a sixth embodiment.

However, in the preceding embodiment, the fourth layer 4' of the central part PC covers the whole of the central part PC through which passes the beam to measure. It may be advantageous in certain situations to reduce this absorption phenomenon. To this end, in a sixth embodiment illustrated in FIG. 7, the fourth layer 4' of the central part only covers a part of the central part PC.

Figure 8:
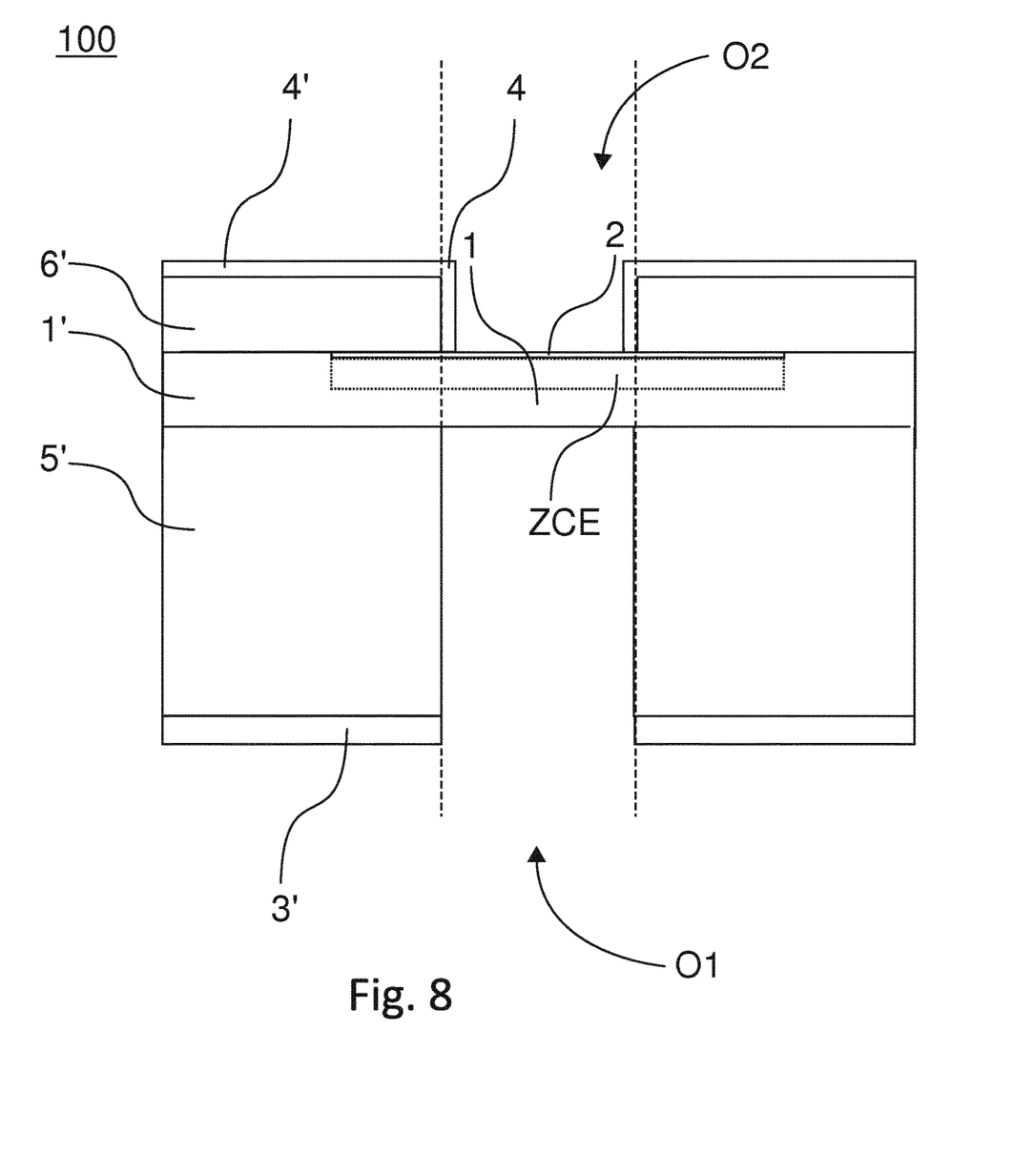
FIG. 8, a sectional view of the structure of the device according to a seventh embodiment.

Furthermore, when the extent of the second layer 2,2' is limited to the central part PC, the MIS (Metal Insulator Semiconductor) structure constituted at the level of the peripheral part PP of the device formed by the first layer of the peripheral part 1', the sixth layer of the peripheral part 6' and by the fourth layer 4' of the peripheral part can perturb the measurement notably by inducing capacitive effects. In order to prevent this phenomenon, in a seventh embodiment illustrated in FIG. 8, the second layer 2' of the peripheral part only partially covers the first layer 1' of the peripheral part while ensuring continuity with the second layer 2 of the central part PC. Put another way, the second layer 2,2' is present in all the central part PC of the device as well as in a zone of the peripheral part PP. The presence of the second layer 2' on a zone more extended than the central part PC limits the formation of the MIS structure mentioned previously. Capacitive phenomena are thus reduced between the first layer of the peripheral part 1', the sixth layer of the peripheral part 6' and by the fourth layer 4' of the peripheral part.

Figure 9:
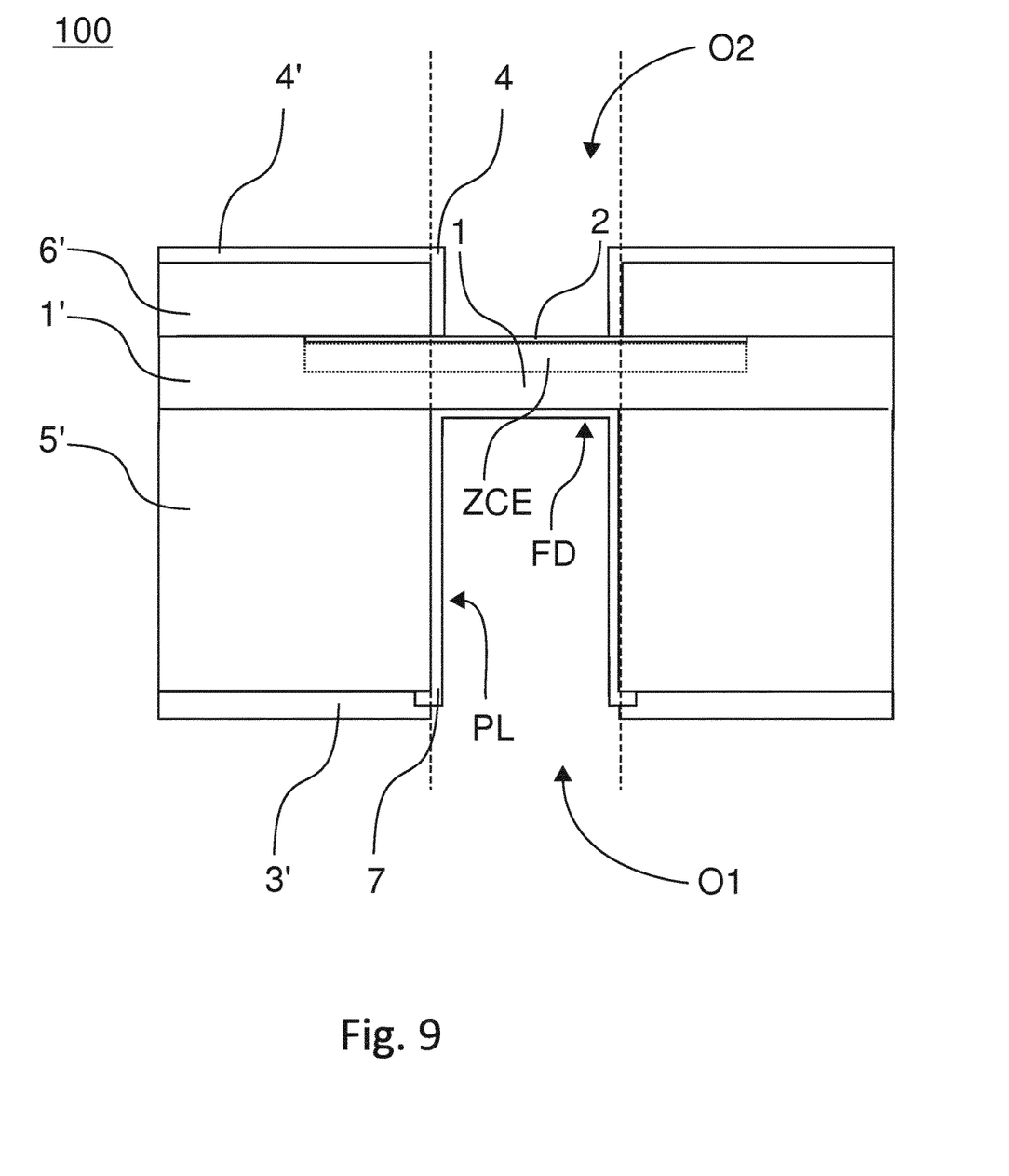
FIG. 9, a sectional view of the structure of the device according to an eighth embodiment.

In an eighth embodiment illustrated in FIG. 9, the first orifice O1 is defined by a side wall PL and by a bottom FD and an oxide layer 7 covers the side wall PL and the bottom FD of the first orifice. Indeed, as has already been mentioned, the part of the orifice O1 arranged in the fifth 5,5' and/or the first layer 1,1' may be obtained by an etching technique, for example by RIE. This manufacturing method has the drawback of producing dangling bonds on the surfaces left free after the etching. These dangling bonds can alter the electrical properties of the material near to said free surfaces. The presence of the oxide layer 7 neutralises the dangling bonds derived from the manufacture of the orifice O1 and thus eliminates the electrical perturbations that these dangling bonds are capable of generating. The oxide layer 7 could be present on the totality of the side wall PL or instead only on the side wall PL constituted of the material of the fifth 5,5' and/or the first layer 1,1', mainly concerned by the problem of dangling bonds.

The invention claimed is:

1. A device for measuring a particle beam comprising a first central part, a second peripheral part, a front face and a rear face, the front face being parallel to the rear face, wherein:
    the central part comprises means for forming a space charge zone intended to be traversed by a particle beam to be measured, charge carriers of a first type and of a second type being generated by said particle beam when the particle beam traverses the space charge zone;
    the peripheral part comprises means for collecting at least one type of charge carrier among the first type or the second type of charge carriers generated at the level of the space charge zone;
    the peripheral part surrounding the central part such that a particle beam can traverse the central part without traversing the peripheral part, an orifice being arranged at a level of the rear face, in a region of the central part such that a thickness of said region of the central part along an axis normal to the front face is less than a thickness of the peripheral part along said normal axis.

2. The measuring device according to claim 1, wherein at least one interface facing the orifice arranged in the rear or front face is structured so as to favour absorption, transmission or reflection of one or several wavelengths.

3. The measuring device according to claim 1, wherein metal beads are present in the central part, said metal beads being spread out according to a periodic structure so as to form a plasmonic array.

4. The measuring device according to claim 1, wherein the central part is made of a wide gap semiconductor material.

5. The measuring device according to claim 4, wherein the wide gap semiconductor material is silicon carbide.

6. The measuring device according to claim 1, wherein the space charge zone is formed by means of a Schottky diode, a PN diode or a PIN diode.

7. The measuring device according to claim 1, wherein the space charge zone of the central part is uniquely situated in the region of the central part facing the orifice.

8. The measuring device according to claim 1, wherein the space charge zone of the central part extends beyond the region of the central part facing the orifice.

9. The measuring device according to claim 1, wherein the central part includes:
    a first layer of a semiconductor material;
    a second layer of a conductor material covering the first layer;
    the space charge zone being formed by the Schottky diode formed by the first layer and the second layer, the orifice being arranged in the first layer.

10. The measuring device according to claim 9, wherein the peripheral part includes:
    a third layer of a conductor material;
    a first layer of a semiconductor material covering the third layer and arranged in continuity with the first layer of the central part;
    a second layer of a conductor material covering the first layer and arranged in continuity with the second layer of the central part;
    the third layer of a conductor material ensuring the collection of a first type of charge carrier generated in the space charge zone.

11. The measuring device according to claim 1 wherein the central part includes:
    a first layer of a semiconductor material doped with a first type of doping;
    a second layer of a semiconductor material doped with a second type of doping opposite to the first type of doping, said second layer covering the first layer;
    a fourth layer of a conductor material, said fourth layer covering the second layer;
    the space charge zone being formed by a PN diode formed by the first layer and the second layer, the orifice being arranged in the first layer.

12. The measuring device according to claim 11, wherein the peripheral part includes:
    a third layer of a conductor material;
    a first layer of a semiconductor material doped with a first type of doping covering the third layer and arranged in continuity with the first layer of the central part;
    a second layer of a semiconductor material doped with a second type of doping opposite to the first type of doping covering the first layer, said second layer being arranged in continuity with the second layer of the central part;
    a fourth layer of a conductor material, said fourth layer covering the second layer, said fourth layer being arranged in continuity with the fourth layer of the eentral part;
    the third layer of a conductor material ensuring the collection of a first type of charge carrier generated in the space charge zone.

13. The measuring device according to claim 9, wherein the peripheral part includes:
    a third layer of a conductor material;
    a first layer of a semiconductor material doped with a first type of doping covering the third layer and arranged in continuity with the first layer of the central part, the first layer of the central part and of the peripheral part having the same doping level;

a sixth layer of an oxide covering the first layer:

a fourth layer of a conductor material covering the sixth layer;

the fourth layer forming a step between the peripheral part and the central part covering a lateral surface of the sixth layer so as to ensure continuity between the fourth layer of the central part and the fourth layer of the peripheral part.

14. The measuring device according to claim 12, wherein the peripheral part comprises a fifth layer of a semiconductor material doped with a first type of doping, the doping level of the fifth layer being higher than the doping level of the first layer, the fourth layer being situated between the third layer and the first layer of the peripheral part.

\* \* \* \* \*